US006912593B2

(12) United States Patent
Deng (10) Patent No.: US 6,912,593 B2
(45) Date of Patent: Jun. 28, 2005

(54) INFORMATION SWITCHING PLATFORM (75) Inventor: Yihui Deng, Shenzhen (CN)

(73) Assignee: Liming Network Systems Co., Ltd., Shenzhen (CN)

(*) Notice: Subject to any disclaimer, the term of this patent is extended or adjusted under 35 U.S.C. 154(b) by 59 days.

(21) Appl. No.: 10/241,502

(22) Filed: Sep. 10, 2002

(65) Prior Publication Data

US 2003/0081617 A1 May 1, 2003

Related U.S. Application Data (63) Continuation of application No. PCT/CN00/00048, filed on Mar. 10, 2000.

(51) Int. Cl.[7] .......................... G06F 15/16; G06F 15/00; H04L 15/56
(52) U.S. Cl. ....................... 709/249; 715/513; 370/398; 370/401
(58) Field of Search ................................. 709/224, 225, 709/227, 244, 249; 715/501.1, 513; 370/401, 398

(56) References Cited

U.S. PATENT DOCUMENTS

| 5,432,781 | A | | 7/1995 | Nimon | |
|---|---|---|---|---|---|
| 6,011,790 | A | * | 1/2000 | Fisher | 370/349 |
| 6,124,880 | A | * | 9/2000 | Shafiee | 348/14.08 |
| 6,373,933 | B1 | * | 4/2002 | Sarkki et al. | 379/126 |
| 6,549,773 | B1 | * | 4/2003 | Linden et al. | 455/426.1 |
| 6,732,175 | B1 | * | 5/2004 | Abjanic | 709/227 |
| 6,754,227 | B1 | * | 6/2004 | Petersen et al. | 370/467 |
| 6,768,994 | B1 | * | 7/2004 | Howard et al. | 707/10 |
| 6,779,025 | B1 | * | 8/2004 | Wolfe et al. | 709/219 |
| 6,829,234 | B1 | * | 12/2004 | Kaplan et al. | 370/352 |
| 2001/0042106 | A1 | | 11/2001 | Kim | |

FOREIGN PATENT DOCUMENTS

| EP | 1227646 | * | 7/2002 | H04M/3/533 |
|---|---|---|---|---|
| WO | WO 99/33278 | | 7/1999 | |
| WO | WO 01/03011 | * | 1/2001 | G06F/17/30 |

OTHER PUBLICATIONS

International Search Report corresponding to International Application No. PCT/CN00/00048 dated Nov. 9, 2000.

* cited by examiner

Primary Examiner—William A. Cuchlinski, Jr.
Assistant Examiner—Tam T. Phan
(74) Attorney, Agent, or Firm—Alston & Bird LLP (57) ABSTRACT The invention discloses a Platform of Information Switch that adapts for switching the integrated information between the different user terminals and the different services terminals. The Platform includes a Device Access gateway for connecting user terminals and switching the correspondent information, an Information Switch for implementing concentrated management and the integrated information switching, and a Service Gateway for interfacing with the service terminals. Wherein the Information Switch consists of a Management System, a Core Switching System and a Platform Routing System; wherein the Core Switching System includes an Information Bus, Switching Modules and a Switching Management Module. The Device Access Gateway and Service Gateway are both connected to the Information Switch via the Information Buses. The Information Switching Platform of present invention can transform the complex information switching process between the user terminals and service terminals to a simple platform operation.

14 Claims, 9 Drawing Sheets

INFORMATION SWITCHING PLATFORM

CROSS-REFERENCE TO RELATED APPLICATIONS

This is a continuation application of PCT/CN00/00048, filed Mar. 10, 2000, which is incorporated herein by reference in its entirety.

FIELD OF THE INVENTION

The present invention relates generally to the information processing technology field, and more particularly to a Platform of Information Switching implementing integrated information switching between any user terminal and any service terminal.

BACKGROUND OF THE INVENTION

The appearance of Electronic Business (e-Business) is a developmental mark of the information society and information processing technology. All e-Business activities can be summed up as the switching of trade information between a user and a service provider (such as store), i.e., trade information switching between a user terminal and a service terminal. For example, a user accesses a store Web site for purchasing commodities through the Internet by sending purchase information to a service provider, and the service provider sends back acknowledgement information. In practice, there are large varieties of communications equipment, communications media and communications protocols that can be used for information switching. Taking communications media as an example, there are Internet, telephone, facsimile, handset, cable TV and terminal equipment based on WAP (Wireless Application Protocol), etc., and there will be more in the future.

Figure 1:
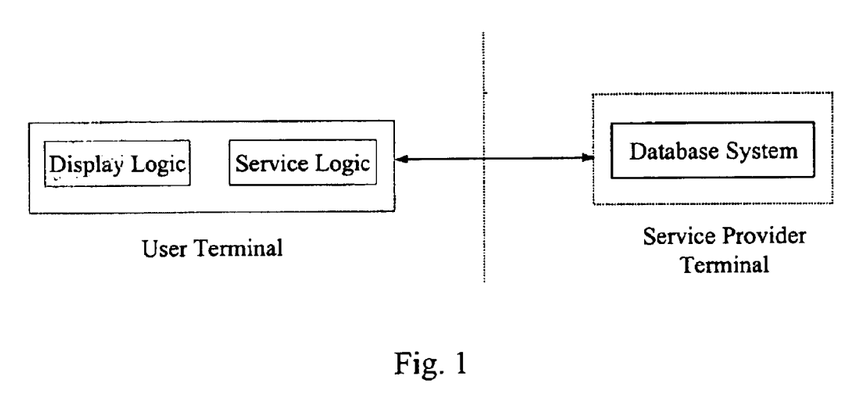
FIG. 1 is an exemplary diagram of client/server mode of information switching.

For information switching processing, the earliest scheme is a mainframe/terminal mode; (i.e., a user operates a mainframe directly through a terminal). This mode is simpler in architecture and faster in response speed, but cannot work collaboratively. Along with development of PCs and LANs, a Client/Server mode appeared. FIG. 1 shows that a client terminal includes service logic and display logic, and service terminals are implemented by a shared database, in general. This scheme begins to consider the separation of a user terminal with a database, but their connection is still close.

Figure 2:
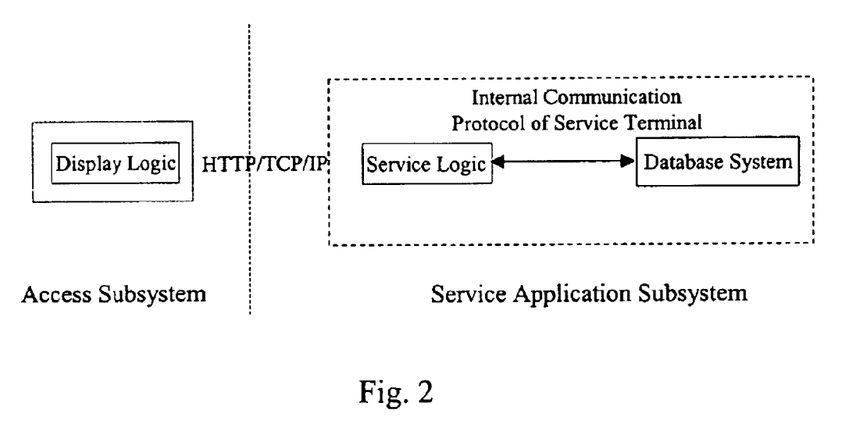
FIG. 2 is an exemplary diagram of three-tier mode of information switching.
Figure 3:
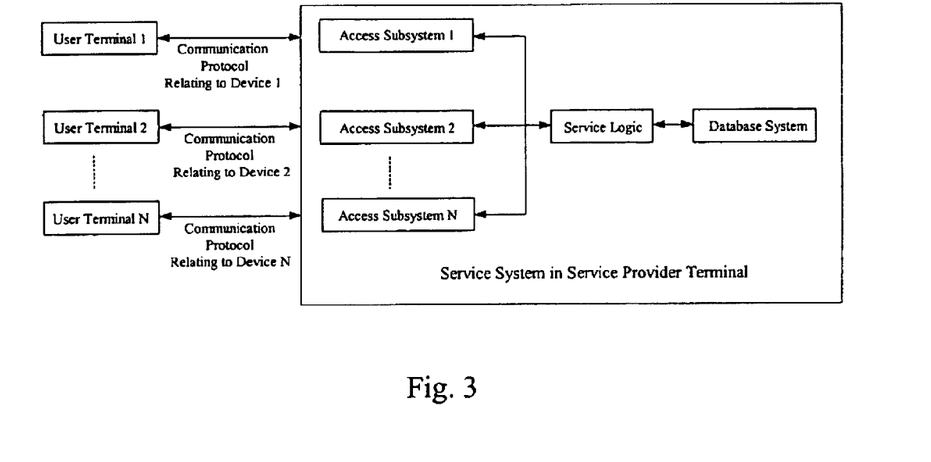
FIG. 3 is an exemplary access diagram of different user terminals for FIG. 2 system.

In order to reduce the complexity of a user terminal, at present, a more general mode is a three-tiered architecture with the Internet in the middle, as shown in FIG. 2. The main feature of the mode is the separation of display logic and service logic. Many computer companies deploy this mode, such as IBM e-Business, Microsoft Window digital nerves system, etc. The relationship between an access subsystem and a service application subsystem is a client/service relationship, and the communications protocol between them is the internal unique protocol of the service terminal. In order to adapt the system for different user terminal equipment and protocols, different access subsystems are used, as shown in FIG. 3.

The information switching mode, mentioned above, is limited to a specific application. Different applications, (i.e., an application subsystem), must have different communication access subsystems related to different services provided. In order to support a variety of information switching activities, every service provider (service terminal) must have an independent and complete application system, including access systems and application systems. This is because whether a service provider or a user, the terminal must independently deal with communications media, communications protocol, etc., which relate to information switching must set up processing systems to process such as information switching media, protocols and other issues.

Figure 4:
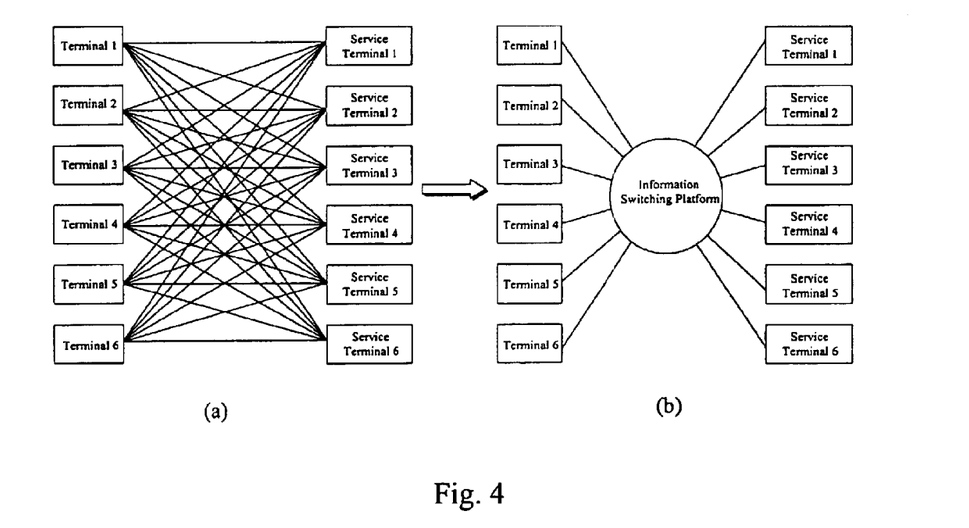
FIG. 4 is an exemplary comparison diagram for comparing the information switching mode of FIG. 2 (as shown in FIG. 4(a)) and the information switching mode of an embodiment of the invention (as shown in FIG. 4(b)).

At present, in information switching application areas such as e-Business, there are a variety of access manners, such as Internet, telephone, facsimile, handset, cable TV, etc. Therefore, a service provider needs to provide different access manners for different users. Consequently, the net connection between user terminals and service terminals is very complicated as shown in FIG. 4(a). This is an obstacle for the growth and spreading of information switching applications, such as e-Business.

Figure 5:
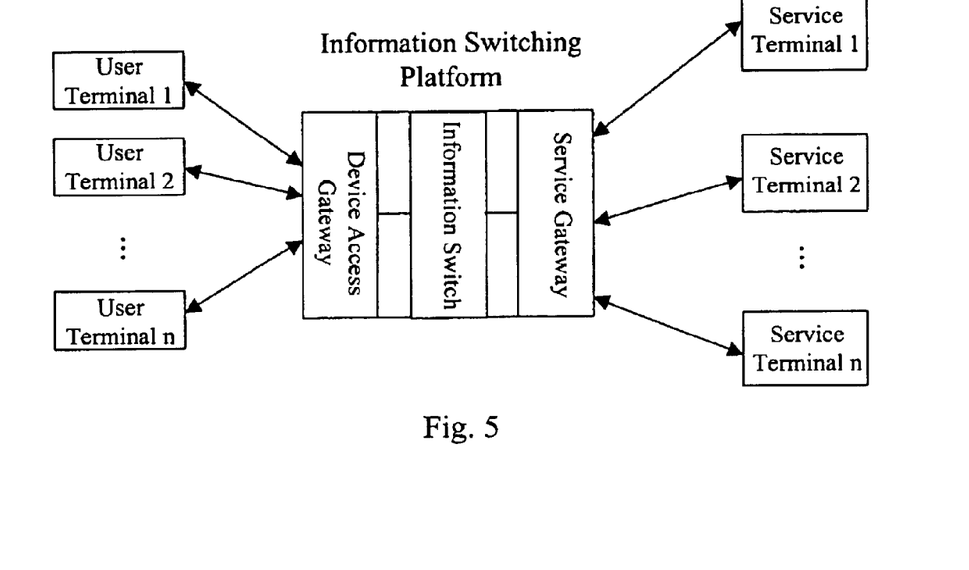
FIG. 5 is an exemplary diagram of five-tier system embodiment of the invention.

In the three-tier mode of information switching, mentioned above, the user terminal is limited to a computer terminal. This greatly limits an information switching application's ability to spread. It should be reasonable to have a synthesized serving platform to integrate different user terminals and different service terminals. Therefore, the present invention proposes a five-tier architecture mode instead of the three-tier mode by adding a Device Access Gateway, an Information Switch and a Service Gateway, as shown in FIG. 5. With the proposed mode, a service provider does not need to set up a processing system for dealing with different communication devices and protocols, it is only necessary to have one leased line and one communications protocol to access user service requests, sent by different communications equipment and protocols, to the Platform of Information Switch. At the same time, a user with convenient terminal equipment he (or she) has, such as a telephone, a facsimile, a computer, etc., can get service provided by service providers connecting with the Platform of Information Switch.

SUMMARY OF THE INVENTION

The purpose of the invention is to provide a platform system for different user terminals and different service terminals. With this platform system, user service requests and acknowledgements, sent through different terminals, different communication lines and different protocols, will be converted to a unique information format (such as SML—Service Mark Language); and service terminal requests and acknowledgements will be converted to the unique information format (SML) too. Therefore, with this platform system, request and acknowledgement information between user terminals and service terminals is matched. Consequently, a user terminal can access service terminals with only a single line, and a service terminal can provide service to user terminals with only one line, too. In this way, complicated connections between user terminals and service terminals are avoided, and discretionary information switching can be implemented between any user terminal and any service terminal.

The Information Switch Platform of the present invention includes:

Device Access Gateways connecting with user terminals for information conversion;

Information Switch for information switching and management; and

Service Gateways connecting with service terminals.

The Information Switch at least includes a Management System and a Core Switching System. The Core Switching System includes an Information Bus, Switching Modules and a Switching Management Module. The Device Access Gateway and the Service Gateway are connected with the Information Switch through the Information Bus.

A request, sent by a user terminal, is converted into a unique format in a Device Access Gateway. Then, the converted request is sent to the Information Switch through the Information Bus. The Information Switch sends the user request information to the Service Gateway, which connects with the service terminal defined in the user request information. The Service Gateway converts the user request with a unique format into a format that is acceptable to the service terminal, and sends it to the service terminal. Finally, the service terminal receives the user service request information.

After the service terminal has completed a user request processing, service acknowledgement information is created. The service acknowledgement is converted to the unique information format in a Service Gateway. Then, the converted service acknowledgement is sent to the Information Switch through the Information Bus. The Information Switch sends the service acknowledgement with a unique format to the Device Access Gateway, which connects with the user terminal defined in the service acknowledgement information. The Device Access Gateway converts the service acknowledgement with a unique format to a format, which is acceptable to the user terminal, and sends it to the user terminal. Finally, the user terminal, which sent the service request before, receives the service acknowledgement information.

A Device Access Gateway comprises an Access Gateway, an Access Monitor, a Security Manager, a Service Interactive Logic and an Information Format Converter. Different service have different Service Interactive Logic, and for a service, the same Service Interactive Logic can be used in every Access Gateway.

The Access Gateway comprises a User Interface and a User Interface Control. The User Interface transfers user interface information to a user terminal with different transmission modes. The User Interface Control decides which form the information will be displayed according to the service interactive logic and the user terminal.

The Access Gateway has variety of types: WEB gateway, TCP/IP gateway, SMS gateway, phone gateway, facsimile gateway, e-mail gateway, WAP gateway, etc.

The Core Switching System is a switching system, which can be extended according to switching capacity requirement.

The Information Bus is an information interface between the Information Switch and peripherals, and consists of Information Input/Output Interfaces and Data Communication Channels underneath. The Information Bus includes a D-Bus, an access bus connecting with Device Access Gateways; an S-Bus, a service bus connecting with Service Gateways; and an M-Bus, a management bus connecting with the management system.

The Switching Management Module includes a Switching Module (SM) Manager, which manages the whole Core Switching System, a SM Monitor, which monitors and controls the Core Switching System, a Session Manager, which manages session information switching, and a Security Manager, which controls security issues of the Core Switching System.

When remote functions, such as roaming, are necessary, the Information Switch further includes a Platform Router System. For an Information Switch with a Platform Router System, the Information Bus further includes a Remote Bus, (R-Bus); the Platform Router System at least includes a Remote Communication Module, which is connected with remote platform and performs control of transaction processing integrality and session issues, and a Routing Table, storing routing information The Service Gateway is protocol converting equipment between service terminals and the Information Switch. The Service Gateway performs conversions between different business communication protocols and the unique communication protocol of an Information Switch. The Service Gateway also includes a Service Monitor and a Security Manager. The Service Gateways are classified into an information service gateway, a toll-free service gateway and a charged service gateway. The service gateway has a variety of types: a stock gateway, a bank gateway, a market gateway, a land gateway, a travel gateway, a school gateway and an assurance gateway, etc.

The unique information format used in an Information Switch can be XML data format.

The invention transforms the complicated Information Switching procedure between user terminals and service terminals to a simple platform operation, as shown in FIG. 4(b). At the same time, the invention implements integrated access, application and management of information switching. Consequently, a user can access different service providers with any terminal equipment, and service providers can provide service to different users with a leased line. Every service terminal with an integrated standard application can provide service to different access equipment. The existing application can be transformed to a standard application via a simple service gateway.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 6:
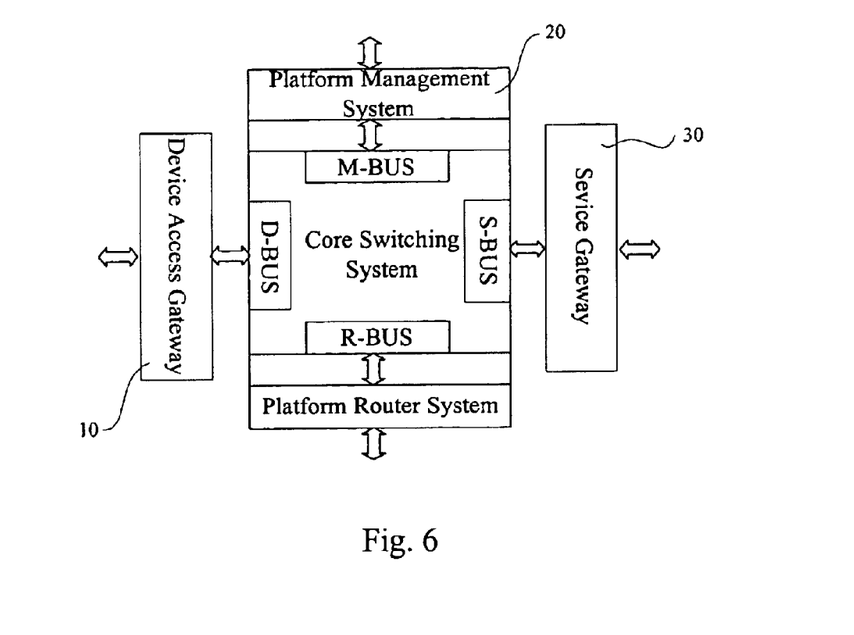
FIG. 6 is an exemplary system architecture diagram of an embodiment of the invention.

FIG. 6 shows an embodiment of a Platform of Information Switch, which comprises a Device Access Gateway 10, an Information Switch (i-switch) 20 and a Service Gateway 30.

Figure 7:
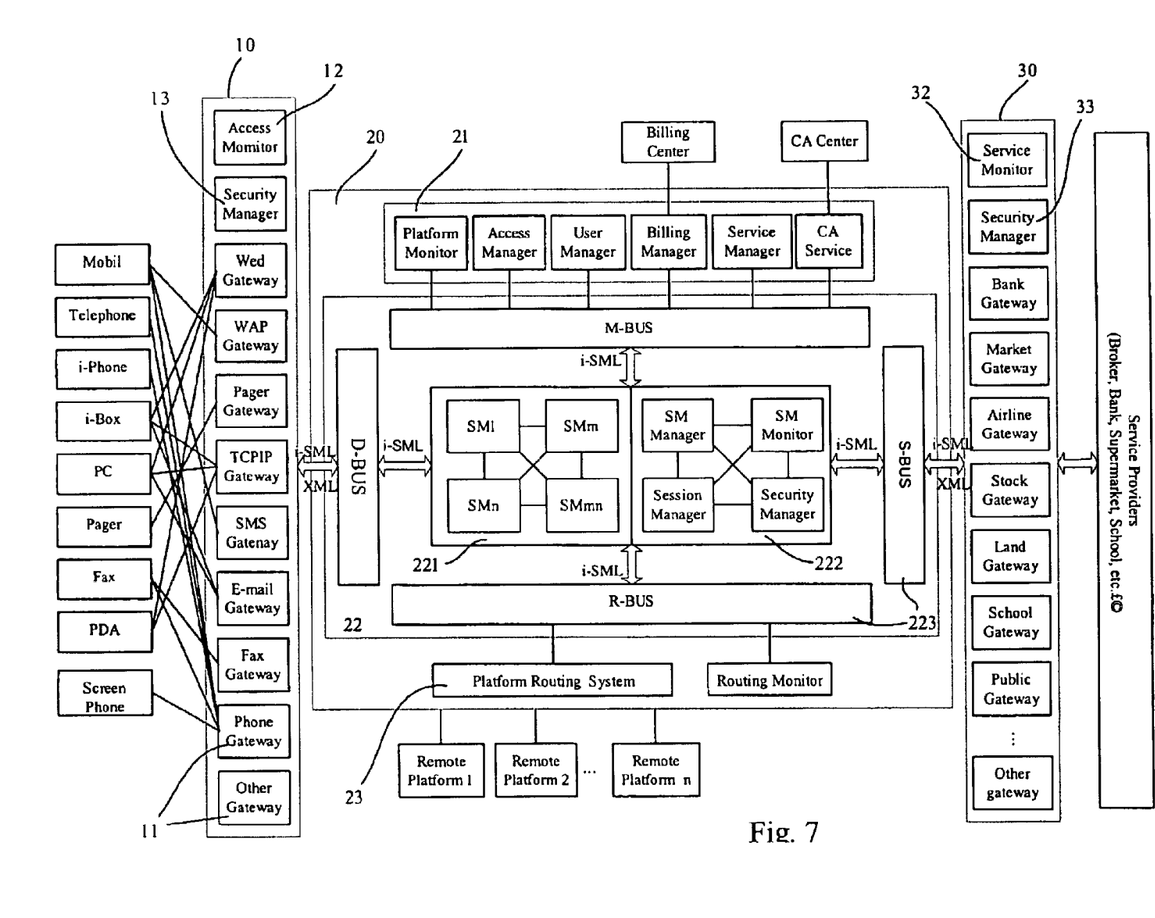
FIG. 7 is an exemplary application architecture diagram of an embodiment of the invention.
Figure 8:
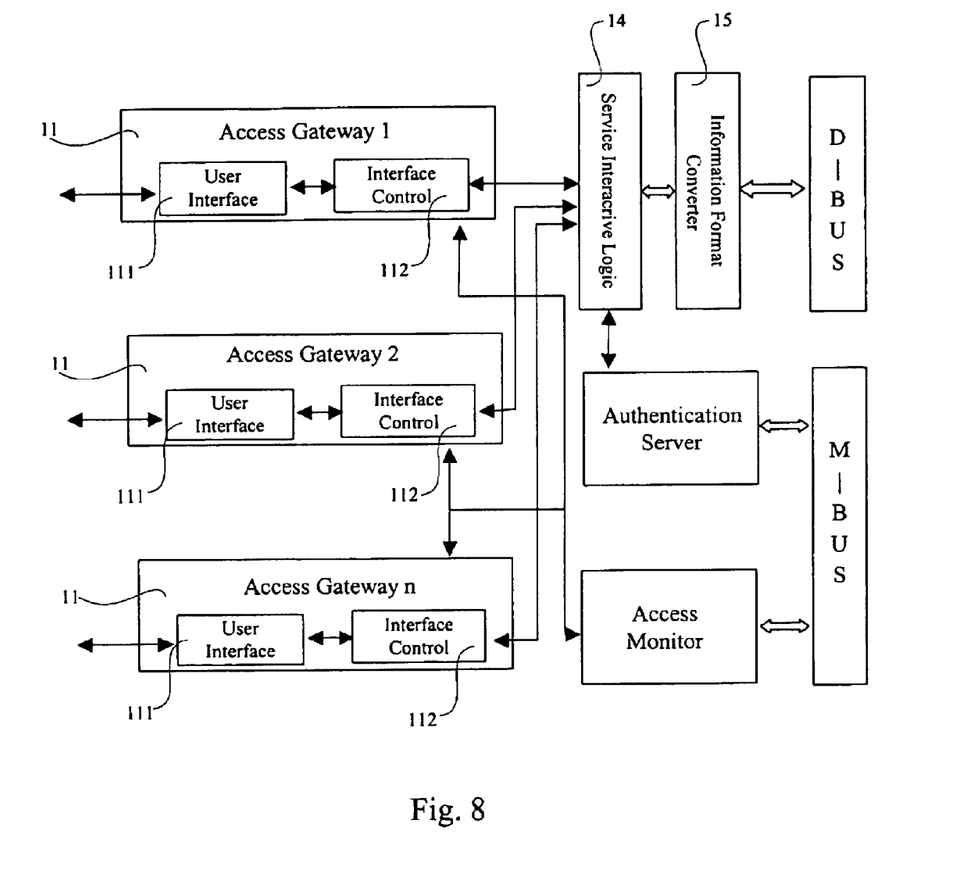
FIG. 8 is an exemplary Device Access Gateway connection diagram of an embodiment of the invention.

The Device Access Gateway 10 accesses user terminals and converts information. Reference to FIG. 7 and FIG. 8, the Device Access Gateway comprises Access Gateways 11, an Access Monitor 12, a Security Manager 13, a Service Interactive Logic 14 and an Information Format Converter 15. The Access Monitor 12 monitors and controls the Access Gateways, and the Security Manager 13 performs user authentication and data encryption and decryption in Access Gateways. The Service Interactive Logic 14 is related with a specific service and is not related with a communications manner. Different services use different Service Interactive Logic, but a Service Interactive Logic can be used for all gateways. The Information Format Converter 15 converts information, coming from user, to a unique data format (such as i-SML), acceptable to the i-switch 20; or according to service acknowledgement information, sent by i-switch, decides Service Interactive Logic to control the Access Gateway transfer to a user terminal.

The Access Gateway 11 interacts with a user terminal by considering different network transmission modes and different user terminals. Each Access Gateway comprises a User Interface 111 and a User Interface Control 112. The User Interface 111 transfers user interface information to different user terminals by taking different transmission modes, such as a Web server in a WWW access gateway. The User Interface Control 112 decides which display mode will be used according to the service interactive logic control and different user terminals. An authentication server of the Security Manager authenticates a user identifier and controls security issues. The Access Monitor monitors every Access Gateway state.

There are a variety of Access Gateways, such as Web gateway, WAP gateway, TCP/IP gateway, SMS gateway, phone gateway, facsimile gateway and e-mail gateway, etc. In the future, a new gateway can be added to the Platform of the Information Switch according to the unique information format of the invention.

Following are several design embodiments of the Access Gateway:

1. WWW gateway: The WWW gateway comprises a WEB server and an application server. The WEB server exchanges information with a user terminal via HTTP protocol. The application server controls specific service logic.

There are two types of Web pages provided by a WEB server:

1) Platform web site and related Information service;

2) Service provider web site and the service interactive control.

The platform web site serves basic information, service searching, private custom-built, transaction function, intelligent information, a user login, access statistic and advertisement broadcasting, etc. Except basic function of a platform, the service provider web site also serves specific information made by a service provider and e-business based on WEB. The service provider web site only gets a user request by WEB interactive and converts the user request to a unique information format, acceptable to the i-switch, and service processing is totally made by a service system provided by the service provider.

In the WWW web site of platform, every service provider has its own service provider web site, which can be directly accessed by a service provider's domain name. At the same time, these service provider domain names can be obtained handily through hierarchical browsing function or service searching function of the platform web site, and service provider web site also can be accessed by selected entry.

2. TCP/IP gateway: The TCP/IP gateway communicates with a special program in a user terminal with TCP/IP protocol, so there are a variety of specific application frames. In summary, there are two types, as shown in FIG. 9:

1) a user terminal directly interfaces to D-Bus with Socket API; and 2) a gateway interfaces to D-Bus with a special service program, which communicates with Socket API having a special terminal data format.

Figure 9:
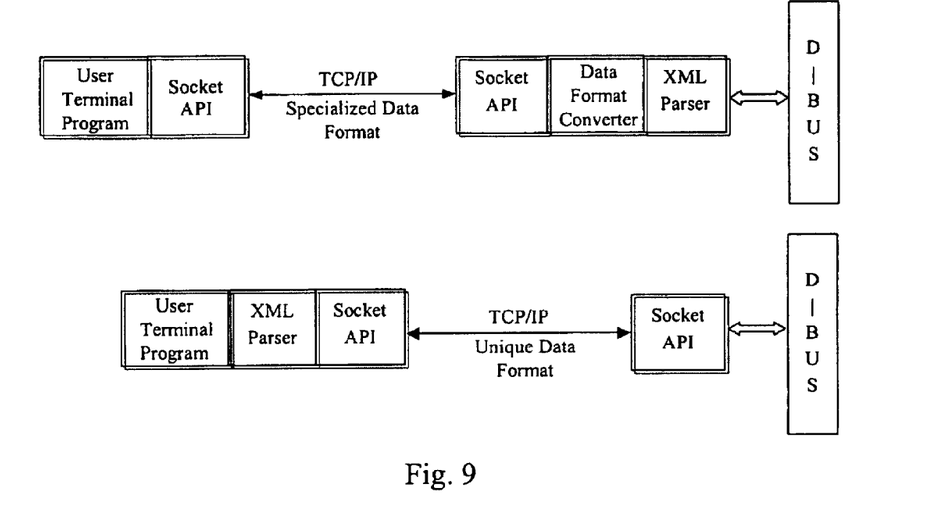
FIG. 9 is an exemplary TCP/IP gateway application flow chart of an embodiment of the invention.

In FIG. 9, the upper part is a mode, which is compatible with an present existing application program of a service terminal; the lower part is a mode that a user terminal program can directly interpret XML and also can create service requests represented by XML, therefore, the TCP/IP gateway needs only transfer a user request without other data format conversion.

Figure 10:
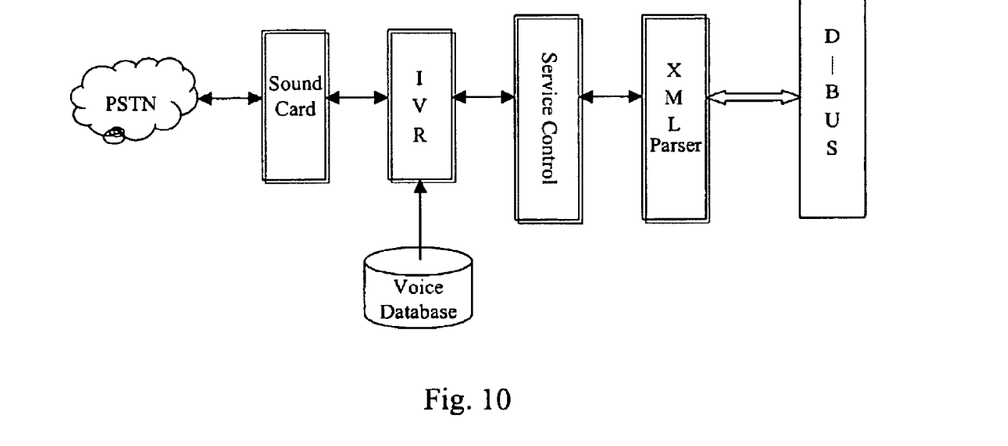
FIG. 10 is an exemplary phone gateway application flow chart of an embodiment of the invention.

3. Phone gateway: The phone gateway interacts information with telephone or i-Phone, as shown in FIG. 10. The phone gateway connects with a Public Switched Telephone Network (PSTN) through a sound card. A user telephone or an i-phone can dial the telephone number of a platform phone gateway, and allow entry to the platform. The sound card receives user telephone DTMF codes and broadcasts voice. If it is an i-phone user, the sound card also sends DTMF codes of the data information, sent by the platform, to the user. A service flow control controls IVR and a user interaction procedure. An XML parser is an information conversion tool, which converts DTMF code flow to XML data file and interfaces with D-Bus. Different services need different IVRs and different service procedure controls.

Figure 11:
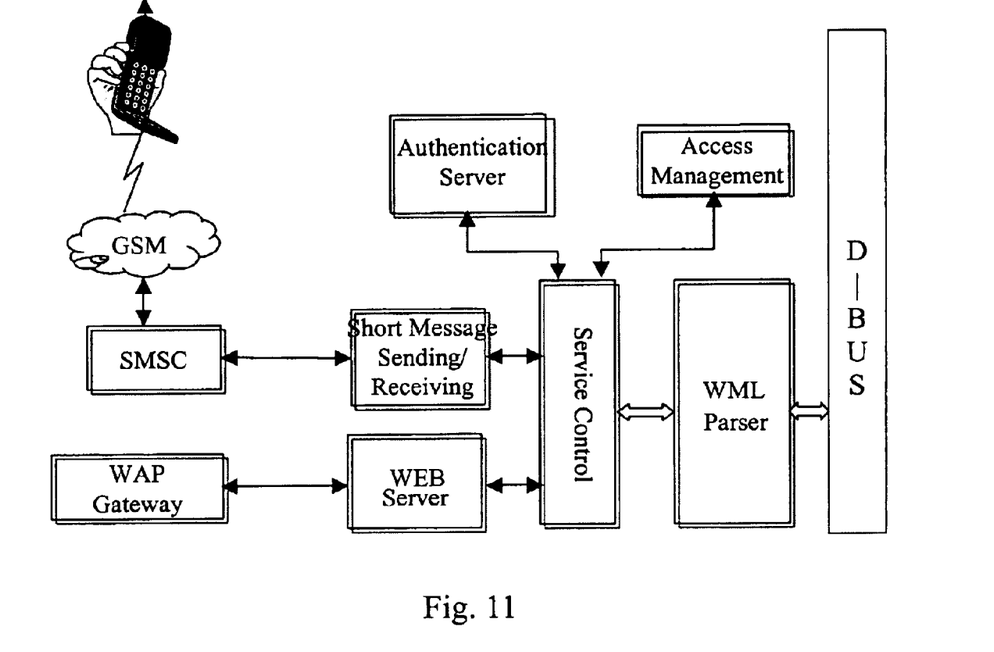
FIG. 11 is an exemplary handset gateway application flow chart of an embodiment of the invention.

4. Handset gateway: The handset gateway exchanges information with a handset. The handset gateway supports two different modes: short message mode and WAP mode, as shown in FIG. 11. The Short Message Module sends and receives short message with the Short Message Service Center (SMSC). The WEB server interacts with WAP gateway through HTTP protocol, and gets or responds to user server requests. A service flow control controls server interactive logic, and converts information coming from a user or a service terminal to page information or short message. The Wireless Mark Language (WML) interpreter converts WML information, coming from a handset, to XML or vice versa, and also converts information between a short message and XML.

The Service Gateway 30 interfaces with a service terminal and provides the platform value-added services. According to user selection, the Service Gateway defines a destination address of an information service returned from the service terminal. Reference to FIG. 7 again, same as the Access Gateway, in the Service Gateway there is a Service Monitor 32, used for monitoring operation of whole Service Gateway, a Security Manager 33, used for authentication and encryption and decryption. The Service Gateway has a variety of types: a stock gateway, a bank gateway, a market gateway, a land gateway, a travel gateway, a school gateway and a assurance gateway, etc.

The Service Gateways are classified into an information Service Gateway, a toll-free Service Gateway and a charged Service Gateway. The information Service Gateway connects with an information inquire organization, which does not concern with specific e-Business, but is one kind of service type of e-Businesses; for example, an information searching service, a public information announcement service, a policy and regulation service, a humanity and geography service etc. The information service gateway can directly provide information service or collects information from other information service organizations. The toll-free Service Gateway connects with toll-free service organizations, and provides e-Business service without on-line payment. The charged Service Gateway connects with a service organization that provides e-Business service with online funds payment, such as a banking system, an online market system, a booking system, etc.

The Service Gateway has several different application frames depending on different service types and different service systems.

1) A Service Gateway communicates to a service terminal with a special program. The Service Gateway communicates with i-switch via the S-Bus, and at the same time, the information is communicated to a corresponding service terminal with a special interface program. XML data is not parsed in the Service Gateway, and is directly sent to the service terminal and interpreted there.

2) A Service Gateway communicates to a service terminal with a message queue. The Service Gateway sends information obtained from the S-Bus to different message queues for different service terminals. The Service Gateway manages access of different service terminals and creates a message queue for every service.

3) A Service Gateway directly integrates platform value-added services. The platform value-added services mainly are information services, such as stock quotation, weather broadcasting and traffic information, etc. The Service Gateway gets information from different service terminals and sends the information directly to an Access Gateway without passing the i-switch.

The i-switch 20 is a kernel of the system and comprises a Management System 21, a Core Switching System 22 and a Platform Router System 23.

The Management System 21 includes subsystems: an Access Manager, a User Manager, a Service Manager, a Billing manager and a Certificate Authentication Service, etc. The billing manager can be connected to a third party billing center and communicates to the third party billing center with a standard data format. The CA, as an agent, delivers electronic certificates to the system users, and can be connected to a third party CA center for communicating electronic certificates. The Platform Monitor generally monitors the Access Monitor 12 of the Access Gateway, the Service Monitor 32 of the Service Gateway, the SM monitor of the Core Switching System and the Router Monitor of the Platform Router System.

Figure 12:
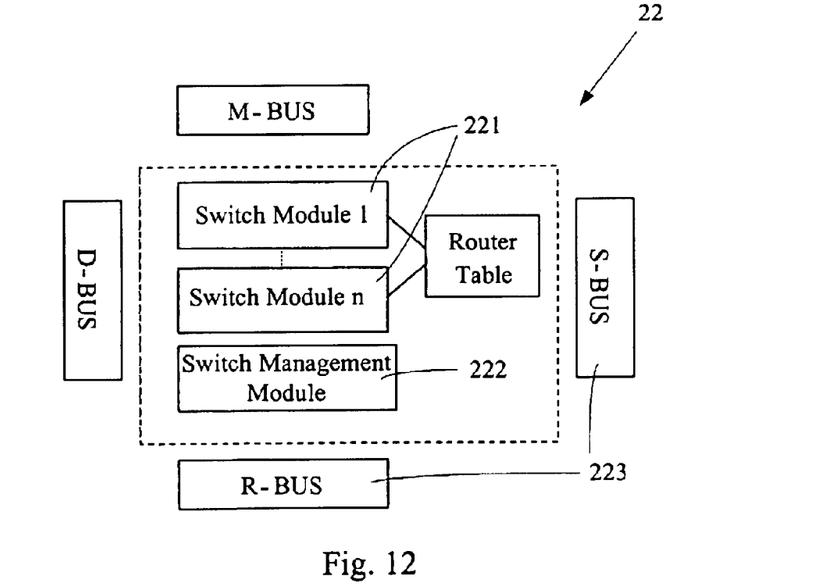
FIG. 12 is an exemplary structure diagram of a Core Switching System of an embodiment of the invention.

The Core Switching System 22 can be extended according to information switching capacity requirements, as shown in FIG. 12, and includes Switching Modules (SM) 221, a Switching Management Module 222 and Information Buses 223.

The Switching Management Module 222 includes a SM manager, a SM monitor, a Session Manager and a Security Manager. A SM switches information in the Core Switching System. The SM manager manages the whole Core Switching System. The SM monitor monitors and controls the Core Switching System, and provides monitoring data to the general monitor system of the platform. The Session Manager manages session type information switching. The Security Manager controls security of the Core Switching System.

The Information Bus 223 includes a D-Bus, which connects various Device Access Gateways to the platform; an S-Bus, which connects various Service Gateways to the platform; an M-Bus, which connects various management servers to the platform; and a R-Bus, a router bus.

All Switching Modules commonly use an addressing table, and communications between Switching Modules uses special communications mechanisms, such as group technology of message queues to implement parallel processing.

Figure 13:
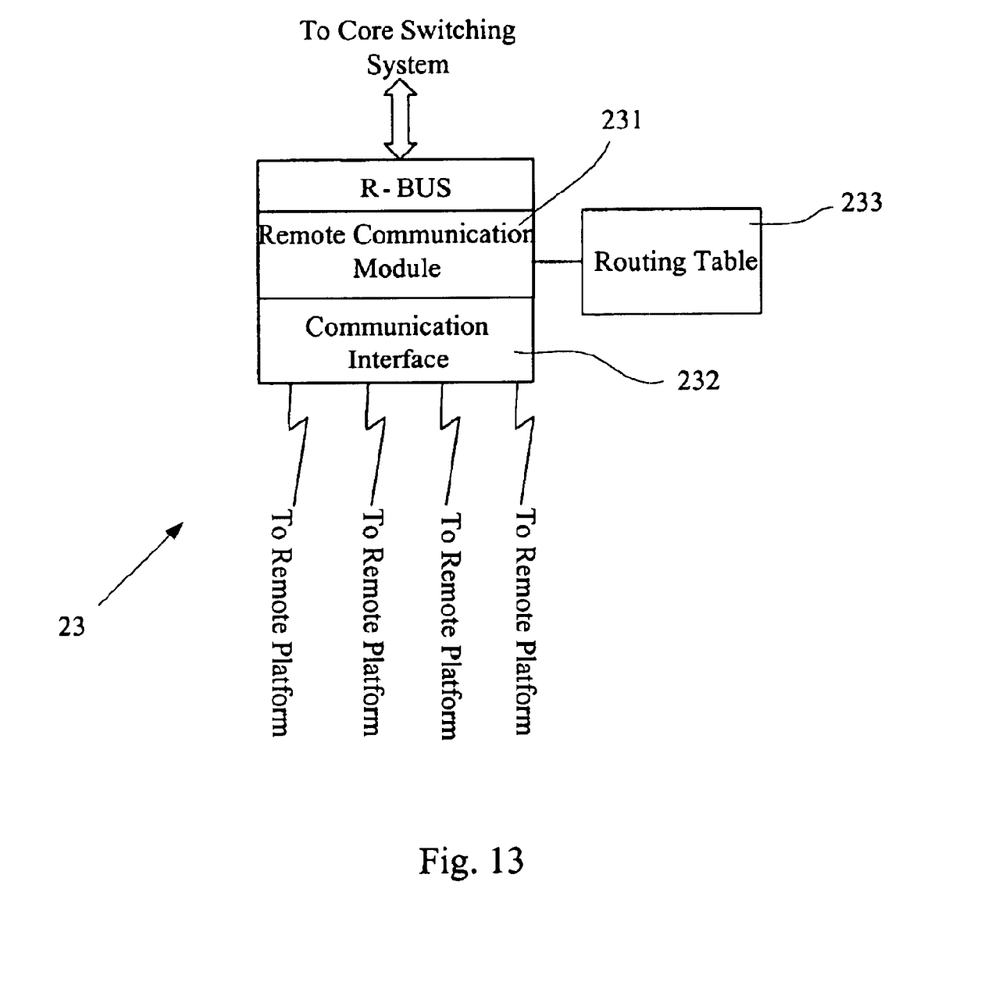
FIG. 13 is an exemplary structure diagram of a Platform Router System of an embodiment of the invention.

The Platform Router System 23 implements data synchronization of remote platforms and roaming service, as shown in FIG. 13; wherein the R-Bus is a routing bus; the Remote Communication Module 231 connects with non-local platforms by Remote Communication Interface 232 and controls transaction integrality and session procedures; the Router Table 233 stores routing information of the platform, communication between platforms uses a special communication protocol, such as message queue.

The security system of the Platform of Information Switch comprises five parts: physical port management, firewall, AAA (Authentication, Authority, Accounting), operator certificate authentication and transaction certificate authentication. There are four layers of security control: system security, network security, data security and transaction security. The operator CA is an internal CA system of the Platform of Information Switch, and is used for authenticating an operator's identity. The transaction CA implements authentication of terminal users and other CA centers, the terminal user stores a certificate in an IC card or other media.

Figure 14:
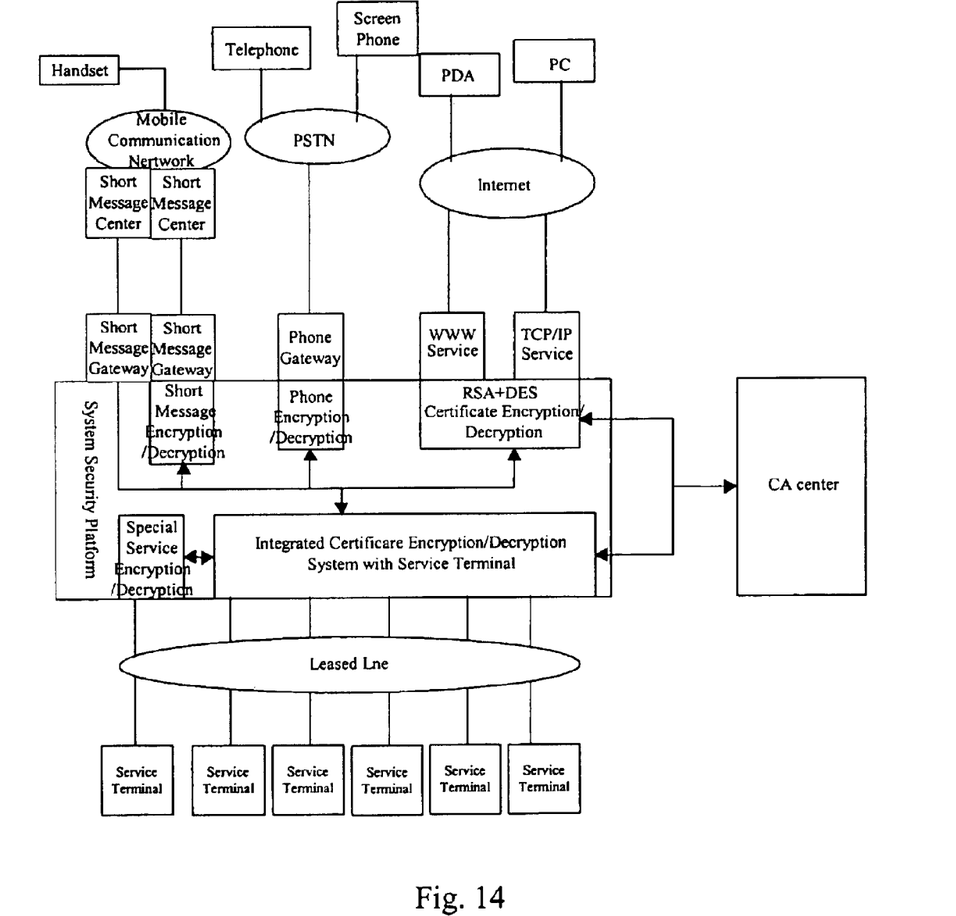
FIG. 14 is an exemplary security architecture of an embodiment of the invention.

Security System Architecture is Shown in FIG. 14, which Includes:

1) Physical port inhibition management: physical port inhibition is used for VLAN management, and is managed by the network.

2) Firewall: a firewall is used for management of TCP/IP ports.

3) AAA: authenticate, authorize and account the accessed users.

4) Operator CA: an operator certificate is authenticated with National CA regulations or systems.

5) Transaction CA: there is different CA for different user terminals, for example:
   a. For handset, in cooperation with SIM card vendor, important data can be encrypted by field encryption (3DES), and handset number can be used as identifier for authentication.
   b. For telephone, as telephone computing ability is limited, there is only identifier authentication without data encryption and decryption, and is implemented by a user identifier or a dynamic password.
   c. For facsimile or pager, as they are terminal of broadcast information, there is no encryption and decryption and authentication.
   d. For PC, there are several security levels, such as IC card, disk or online download etc.; the IC card mode is recommended by using special program for authentication and encryption and decryption.

e. For a special terminal, such as PDA, there are special programs for authentication and encryption and decryption.

f. For screen telephone, the IC card mode is used for authentication.

g. A security system between service terminal and platform is same as the security system between PC and platform. A combination mode of symmetric encryption and decryption and public key (PKI) is used for implementing identifier authentication and digital signatures, etc.

In the Following, an Information Switching Procedure is Described.

Different user terminals connect with different communications networks, so information coming from a user terminal should be converted to a unique information format through an Access Gateway, before entering the D-Bus of an Information Switch. For example, the unique information format is XML in this embodiment, but can be other formats. According to the service request of a user terminal, the Information Switch switches the converted service request information to the S-Bus, which is connected to a service terminal providing the requested service. A Service Gateway sends the converted service request information to the service terminal. Then, the service terminal analyzes the service request information and processes the service request.

After the service request has been processed in the service terminal, an acknowledgement information for the service request is created. The Service Gateway converts the acknowledgement information to the unique information format and sends it to the Information Switch via S-Bus. According to the user terminal that the acknowledgement information wants to be sent to, the Information Switch switches the converted acknowledgement information to a corresponding Access Gateway. The Access Gateway converts the converted acknowledgement information with a unique information format to a format, accessible to the user terminal, and sends it to the user terminal.

In addition, during the switching procedure, authenticating a user identifier, checking the completeness of transaction processing, encrypting and decrypting of data, etc. are made by corresponding modules.

An information switching procedure, which switches a user terminal to a service terminal though an Information Switch is described in the following:

1. Service Request Procedure:
   1) Different user terminals access to different Access Gateways of a platform though different access network, for example, a TCP/IP terminal connects to a TCP/IP gateway of a platform through Socket API, a telephone connects to a phone gateway through IVR, a browser connects to a WEB site of platform through HTTP, etc.
   2) A Device Access Gateway converts the service request coming from user terminal to XML format though an XML parser. The service request and other addition information are packed to an information packet.
   3) According to a destination address in the packet, the D-Bus sends the information packet to a corresponding message queue (Queue Mn, Queue Sn or Queue Rn).
   4) A Service Gateway obtains the information packet in a Queue Sn via S-Bus by calling MQI, then the information packet is processed in two situations:

Send the information packet to a service queue corresponding to the service terminal in the information packet.

Send the information packet to the service terminal defined in the information packet through Socket API (TCP/IP or HTTP).
   5) The service terminal gets the service request information through Socket API or MQI.
   6) A user service agent gets a user service request data from the service request information by XML Parser.
   7) The service request data is sent to a service system, which provides the requested service.

2. Service Terminal Acknowledgement Procedure:
   1) After a user service request has been processed, the service terminal sends a service acknowledgement to the user service agent.
   2) The service acknowledgement is converted to XML format through the XML Parser.
   3) The service acknowledgement information is sent to the platform via MQI or Socket API.
   4) A Service Gateway receives the service acknowledgement information via MQI or Socket API.
   5) According to the destination address of the service acknowledgement information, a Service Gateway sends the service acknowledgement information to a message queue Dn of a corresponding Access Gateway via S-Bus.
   6) An Access Gateway gets the service acknowledgement information via D-Bus. The received service acknowledgement information has been converted to an acknowledgement data by XML Parser. The acknowledgement data is converted to different information types, which is acceptable to different user terminals. For example, a TCP/IP gateway converts the acknowledgement data to a format that can be accepted by a TCP/IP device; a phone gateway converts the acknowledgement data to a voice information through IVR or an i-phone acceptable format; a Web gateway converts the acknowledgement data to HTML; a WAP gateway converts the acknowledgement data to a short message or a WAP message; an Email gateway converts the acknowledgement data to an Email and sends to the user, a pager gateway converts the acknowledgement data to a paging message and sends to a paging station.

What is claimed is:

1. An information switching platform, comprising:

a device access gateway for connecting a user terminal and converting information;

an information switch for managing and switching information; and a service gateway interfaced with a service terminal;

wherein the information switch comprises a management system and a core switching system; the core switching system comprises an information bus, a switching module and a switching management module; and the device access gateway and the service gateway are both connected with the information switch via the information bus;

wherein a service request information sent by the user terminal is converted to a unique format information by the device access gateway, and the converted service request information is sent to the information switch via the information bus; according to the service terminal providing the service defined in the service request information, the information switch switches the converted service request information to the service gateway connected with the service terminal; and the service gateway converts the service request information with a unique format to a format, accessible to the service terminal, and sends to the service terminal, the service terminal receives the service request information; and wherein the service terminal creates a service acknowledgement information after the service request has been processed and sends the service acknowledgement information to the service gateway, the service gateway converts the service acknowledgement information to a unique format information and sends the converted acknowledgement information to the information switch via the information bus; according to the user terminal defined in the service acknowledgement information, the information switch sends the converted service acknowledgement information to the corresponding device access gateway; and then the device access gateway converts the service acknowledgement information with a unique format to a format, accessible to the user terminal, the user terminal receives the service acknowledgement information.

2. The information switching platform according to claim 1, wherein the device access gateway comprises an access gateway, an access monitor, a security manager, a service Interactive Logic and an information format converter.

3. The information switching platform according to claim 2, wherein different services deploy different service interactive logic, and for a service, the same service interactive logic is used for all access gateways.

4. The information switching platform according to claim 2, wherein the access gateway comprises a user interface, which sends user interface to user terminal by different transmission mode; and a user interface control, which decides which display mode to be used according to the service interactive logic and different user terminals.

5. The information switching platform according to claim 1, wherein the core switching system is an extendable system according to switching capacity requirements.

6. The information switching platform according to claim 1, wherein the information bus is an information interface between the information switch and peripherals, and comprises an information input/output interface and a data communication channel.

7. The information switching platform according to claim 1, wherein the information bus comprises a D-Bus that is an access bus connecting with the device access gateways; an S-Bus that is a service bus connecting with the service gateways; and an M-Bus that is a management bus connecting with the management system.

8. The information switching platform according to claim 1, wherein the switching management module comprises a switching module manager that manages the whole core switching system; a switching module monitor that monitors and controls the core switching system; a session manager that manages session type information switching; and a security manager that controls security of the Core Switching System.

9. The information switching platform according to claim 1, further comprising:

a platform router system, which provides roaming service between different platforms;

information synchronization between different platforms; and information remote backup function.

10. The information switching platform according to claim 9, wherein the information bus comprises a D-Bus that is an access bus connecting with the device access gateways; an S-Bus that is a service bus connecting with the service gateways; an M-Bus that is a management bus connecting with the management system; and an R-Bus that is a system router bus connecting with the platform router system.

11. The information switching platform according to claim 9, wherein the platform router system comprises a remote communication module for connecting with remote platforms; and a router table for storing routing information.

12. The information switching platform according to claim 1, wherein the service gateway further includes a service monitor and a security manager.

13. The information switching platform according to claim 1, wherein the service gateway has a plurality of types of an information service gateway; a toll-free service gateway; and a charged service gateway.

14. The information switching platform according to claim 1, wherein the unique information format, accessible to the information switch, is XML data format.

* * * * *